US008700254B2

(12) United States Patent
Basir et al.

(10) Patent No.: US 8,700,254 B2
(45) Date of Patent: Apr. 15, 2014

(54) HARDWARE RECONFIGURABLE VEHICLE ON-BOARD DIAGNOSTIC INTERFACE AND TELEMATIC SYSTEM

(75) Inventors: Otman A. Basir, Waterloo (CA); William Ben Miners, Guelph (CA); Sergey M. Krivtsov, Kitchener (CA)

(73) Assignee: Intelligent Mechatronic Systems Inc., Waterloo, Ontario (CA)

( * ) Notice: Subject to any disclaimer, the term of this patent is extended or adjusted under 35 U.S.C. 154(b) by 686 days.

(21) Appl. No.: 12/910,991

(22) Filed: Oct. 25, 2010

(65) Prior Publication Data

US 2011/0098879 A1 Apr. 28, 2011

Related U.S. Application Data

(60) Provisional application No. 61/254,494, filed on Oct. 23, 2009.

(51) Int. Cl.
*G01M 17/00* (2006.01)
*G06F 7/00* (2006.01)
*G06F 19/00* (2011.01)

(52) U.S. Cl.
USPC ............................ 701/31.4; 701/32.7; 701/36

(58) Field of Classification Search
USPC ........... 701/31.4, 32.7, 36; 709/201, 217, 218
See application file for complete search history.

(56) References Cited

U.S. PATENT DOCUMENTS

| | | | | |
|---|---|---|---|---|
| 6,526,340 | B1 | 2/2003 | Reul et al. | |
| 6,807,469 | B2 * | 10/2004 | Funkhouser et al. | 701/31.8 |
| 6,823,243 | B2 | 11/2004 | Chinnadurai et al. | |
| 6,925,368 | B2 | 8/2005 | Funkhouser et al. | |
| 6,957,133 | B1 | 10/2005 | Hunt et al. | |
| 7,113,127 | B1 * | 9/2006 | Banet et al. | 342/357.31 |
| 7,225,065 | B1 | 5/2007 | Hunt et al. | |
| 7,228,211 | B1 | 6/2007 | Lowrey et al. | |
| 7,248,954 | B2 | 7/2007 | Chinnadurai et al. | |
| 7,447,574 | B1 | 11/2008 | Washicko et al. | |
| 7,502,672 | B1 * | 3/2009 | Kolls | 701/31.6 |
| 7,522,979 | B2 | 4/2009 | Pillar | |
| 7,539,564 | B2 | 5/2009 | Siebel et al. | |
| 7,584,029 | B2 | 9/2009 | Legate et al. | |
| 7,596,437 | B1 | 9/2009 | Hunt et al. | |
| 7,672,763 | B1 * | 3/2010 | Hunt et al. | 701/33.2 |
| 7,778,752 | B1 * | 8/2010 | Hunt et al. | 701/36 |
| 7,904,219 | B1 * | 3/2011 | Lowrey et al. | 701/32.3 |
| 2003/0088346 | A1 | 5/2003 | Calkins et al. | |
| 2004/0142722 | A1 * | 7/2004 | Everett | 455/550.1 |
| 2006/0217855 | A1 * | 9/2006 | Chinnadurai et al. | 701/29 |
| 2007/0069947 | A1 * | 3/2007 | Banet et al. | 342/357.09 |
| 2008/0012725 | A1 | 1/2008 | Zoladek et al. | |
| 2008/0219274 | A1 * | 9/2008 | Kato et al. | 370/401 |
| 2009/0063745 | A1 | 3/2009 | Morris et al. | |
| 2009/0077267 | A1 * | 3/2009 | Alrabady et al. | 709/249 |
| 2009/0262714 | A1 * | 10/2009 | Lim et al. | 370/338 |
| 2009/0316673 | A1 * | 12/2009 | Yagley et al. | 370/338 |
| 2010/0235891 | A1 * | 9/2010 | Oglesbee et al. | 726/5 |

* cited by examiner

*Primary Examiner* — Khoi Tran
*Assistant Examiner* — Jaime Figueroa
(74) *Attorney, Agent, or Firm* — Carlson, Gaskey & Olds, P.C.

(57) ABSTRACT

A telematic system interfaces with a vehicle diagnostic interface to provide access to vehicle health and performance related information. The telematic system includes a primary gateway connector and various subsystem modules that connect to the primary gateway connector to provide functions in addition to those provided by the primary gateway connector.

18 Claims, 6 Drawing Sheets

HARDWARE RECONFIGURABLE VEHICLE ON-BOARD DIAGNOSTIC INTERFACE AND TELEMATIC SYSTEM

CROSS REFERENCE TO RELATED APPLICATION

This application claims priority to U.S. Provisional Application No. 61/254,494 which was filed on Oct. 23, 2009.

BACKGROUND

This disclosure generally relates to an on-board platform with a diagnostics interface for a vehicle. More particularly, this disclosure relates to a reconfigurable in-vehicle platform with a diagnostics interface that includes mounting provisions to maintain overall rigidity, passenger compartment clearance, wireless performance, and enable multi-device installation and communication. The disclosed interface includes a primary diagnostics interface that is received into a vehicle's diagnostic link connector. The primary diagnostics interface includes a connector that can receive expansion modules to enable desired additional and supplemental functions in addition to those provided in the primary diagnostic interface.

SUMMARY

A disclosed telematic system interfaces with an on-board diagnostic (OBD) interface to provide access to vehicle diagnostic and other vehicle performance related information. The disclosed example telematic system includes a primary gateway connector and various subsystem modules. In this disclosed example the primary gateway connector is connected to the OBD interface and is engageable with many different subsystem modules that provide functions in addition to those provided by the primary gateway connector.

These and other features disclosed herein can be best understood from the following specification and drawings, the following of which is a brief description.

DETAILED DESCRIPTION

Figure 1:
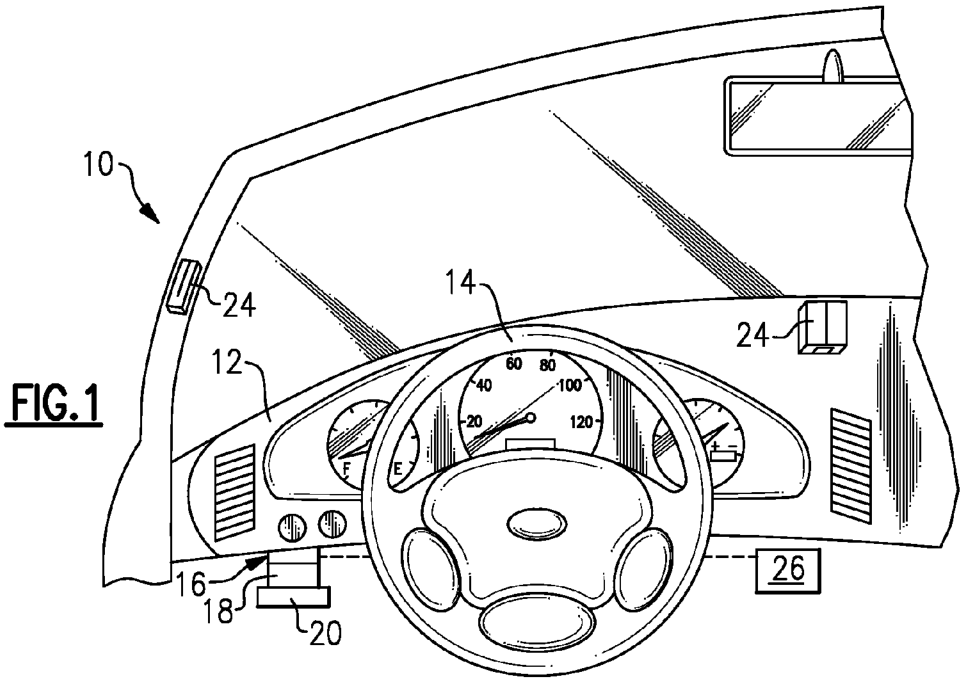
FIG. 1 is a schematic view of a vehicle including the example telemetric system.

Referring to FIG. 1, an example vehicle 10 includes a dashboard 12 and a steering wheel 13. An on-board diagnostic (OBD) interface 16 provides access to vehicle diagnostic and other vehicle performance related information that is accumulated by a vehicle controller 26. The example vehicle 10 is equipped with a disclosed example telematic system 15 that includes a primary gateway connector 18 and various subsystem modules 20, 24. Standards exist for the communication protocols and the physical interface of the example OBD interface 16. The example OBD interface 16 is a connector that includes a specific physical configuration and electrical pin communication callouts identified as a J1962 connector. Moreover other example connector configurations as are know that provide access with on-board vehicle diagnostic systems would also benefit from this disclosure.

There are currently several classes of devices that mate to the OBD interface 16 to provide diagnostic functions. One example of such tool that is commonly utilized is a scan tool that is utilized by repair facilities to identify problems and malfunctions with the vehicle. Such scan tools include a cable and connector that is compatible with the OBD interface 16. Another class of tool includes vehicle data loggers that utilize a connection with the OBD interface 16 to log and record data during vehicle operation. A vehicle data logger is commonly housed in a rigid enclosure that is supported by the OBD interface 16. Such vehicle data loggers are designed for long term use to record driving information and other interface data that may be desired to log certain vehicle operation characteristics. Still another class of device utilized with the OBD interface 16 includes real time telematic devices that communicate vehicle information to a remote location by way of a long range wireless interface.

The OBD interface 16 is often located below the steering wheel 14 on the driver's side of the passenger cabin. Rigid objects that are connected to the OBD interface 16 extend downward and could interfere with a drivers comfort and extend into the area where a driver's legs are placed. Moreover, each of the example classes of device is dedicated to a specific task and therefore is not adaptable to different desired requirements and functions. In this disclosed example the primary gateway connector 18 is connected to the OBD interface 16 and is engageable with the subsystem modules 20, 24 that provide additional functions in addition to those provided by the primary gateway connector 18.

Figure 2:
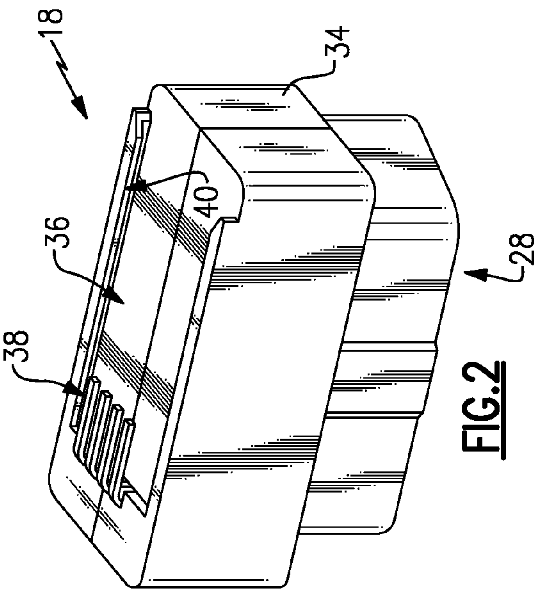
FIG. 2 is perspective view of an example primary gateway connector.
Figure 3:
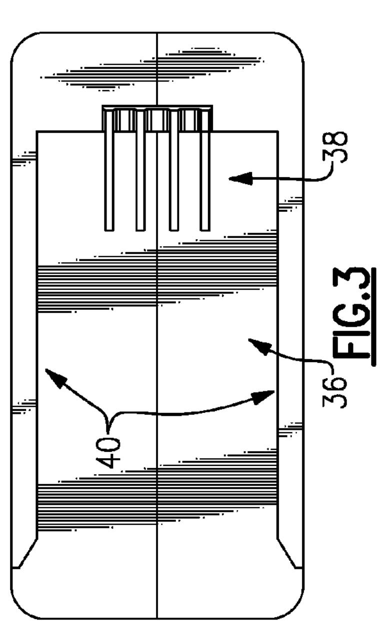
FIG. 3 is a top view of the example gateway connector.
Figure 4:
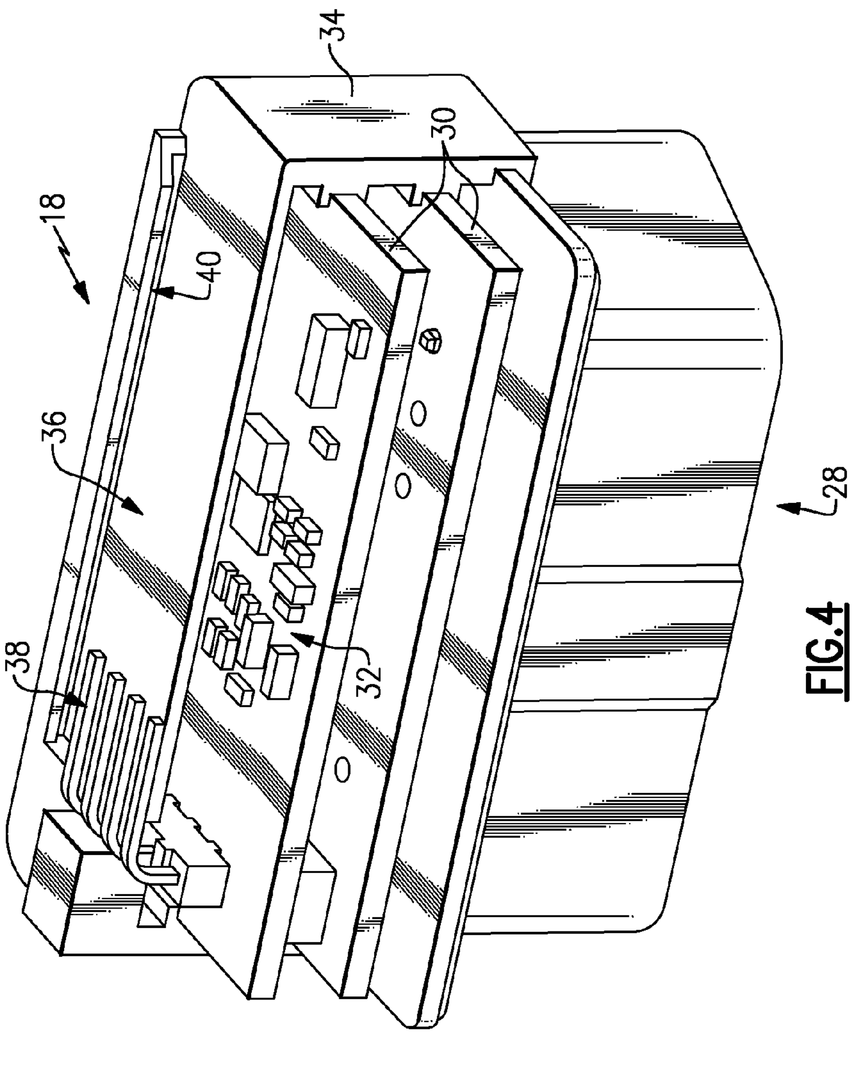
FIG. 4 is a partial sectional view of the example gateway connector.

Referring to FIGS. 2, 3, and 4, the example primary gateway connector 18 includes a first connector 28 that engages the OBD interface 16. The first connector 28 engages the OBD interface 16 and also holds the primary gateway connector 18 in place and engaged to the OBD interface 16.

The primary gateway connector 18 includes printed circuit boards 30 that are supported within an enclosure 34 that is formed integrally with the first connector 28. The circuit boards 30 includes various electrical components 32 as are required to provide the communication and logic functions provided by the primary gateway connector 18.

The enclosure 34 defines a second connector 36 disposed on an opposite of the first connector 28. The second connector 36 includes a plurality of electrical connections 38 and mechanical guides 40 configured to receive a corresponding tab 42 of a subsystem module. The primary gateway connector 18 mounts to the OBD interface 16 and remains in place. The primary gateway connector 18 defines a mounting location for different subsystem modules that provide a selection of different functions corresponding to application specific desired requirements. Accordingly, once the primary gateway connector 18 is mounted to the OBD interface 16, desired features can be interchanged without removal of the gateway connector 18 by changing out subsystem modules.

The example primary gateway connector 18 includes the necessary logic components and programming to control specific vehicle functions, interface, analyze and summarize vehicle information obtained from the vehicle controller 26 through the OBD interface 16. The primary gateway connector 18 further includes the necessary logic that provides for communication with the various types of secondary subsystem modules 20, 24 (FIG. 1).

The primary gateway connector 18 includes subsystem logic that has sufficient processing power to automatically detect and identify the function and features of the subsystem module once mounted to the gateway connector 18. This process ensures that a different subsystem module can be attached and its benefits realized without additional configuration or setup. Moreover, devices that are mounted and removed, or utilized across different vehicle can be installed and removed easily without substantial set up time or other additional procedures.

Figure 7:
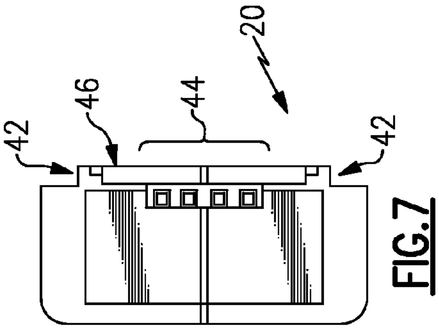
FIG. 7 is a side view of the example subsystem module.
Figure 6:
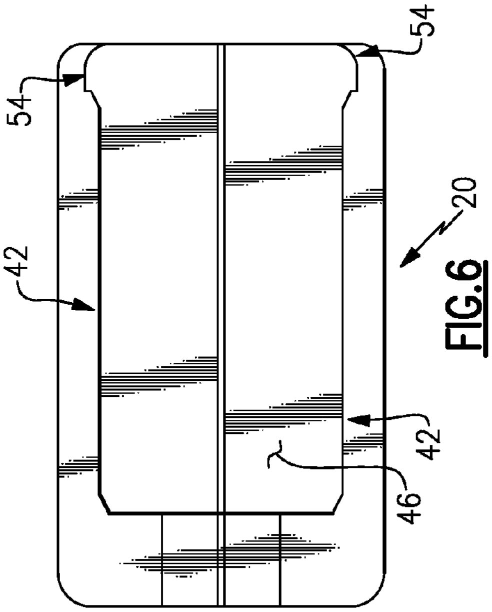
FIG. 6 is a bottom view of the example subsystem module.
Figure 5:
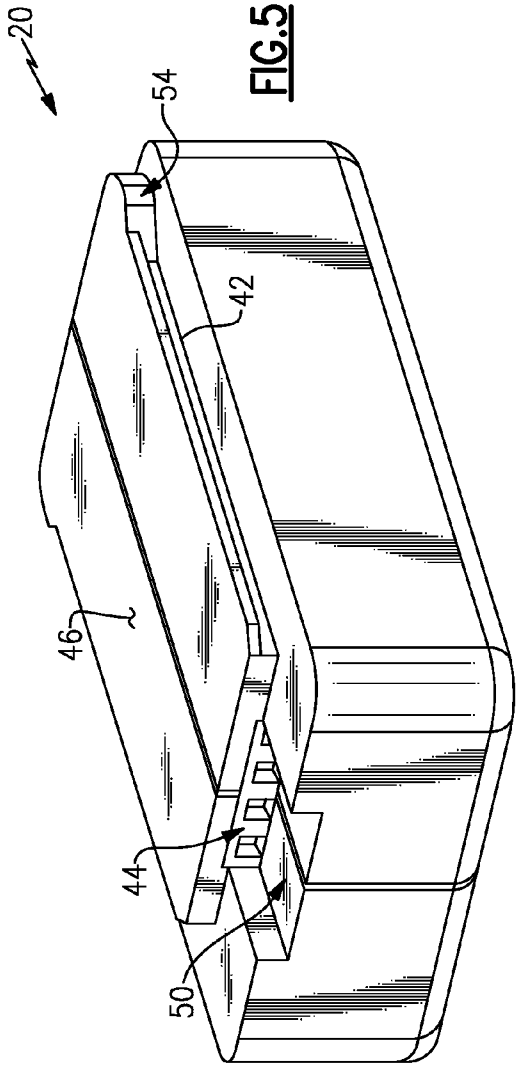
FIG. 5 is a perspective view of an example subsystem module.
Figure 9:
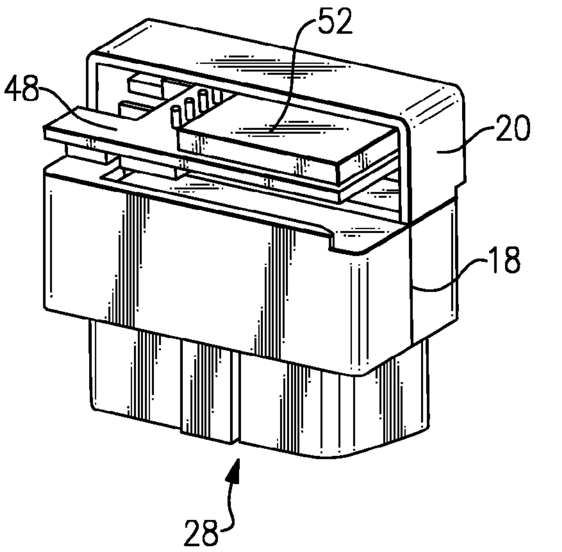
FIG. 9 is a partial cutaway view of a subsystem module mounted to the primary gateway connector.

Referring to FIGS. 5, 6, and 7, the example subsystem module indicated at 20 includes a plurality of connectors 44 that correspond with the pin connectors 38 provided on the primary gateway connector 18. The subsystem module 20 also includes the tabs 42 formed on either side of the raised surface 46 that slide fit within the slots 40 defined by the enclosure 34 of the primary gateway connector 18. Each subsystem module 20 includes substantially identical external physical features that correspond and fit into the second connector 36 of the primary gateway connector 18. However, each subsystem module 20 includes a circuit board 48 (FIG. 9). The circuit board 48 includes applicable electronic components 52 that are required to perform the specific desired functions of that specific subsystem module 20.

In one example the subsystem module 20 includes components 52 that include elements required to transmit and receive radio frequency signals such as a transceiver or receiver. Moreover, the electric components 52 can include those components required to function with global communication networks. As appreciated, a global communication network can operate with global network satellite systems (GNSS), and/or global system mobile (GSM) communication systems. It should be understood that various different subsystem modules can be configured to provide different discrete functions that utilize vehicle operation data gathered through the OBD interface 16. The disclosed telematic system 15 provides a single mounting location as defined by the primary gateway connector 18 for many different subsystem modules 20, 24. A few examples are disclosed here, but many other features can be provided by different subsystem modules configured to mate to the primary gateway connector 18, including short-range wireless (WiFi ,Bluetooth), WiMAX, dedicated short-range communications (DSRC), and multimodal internal feedback mechanisms.

Figure 8:
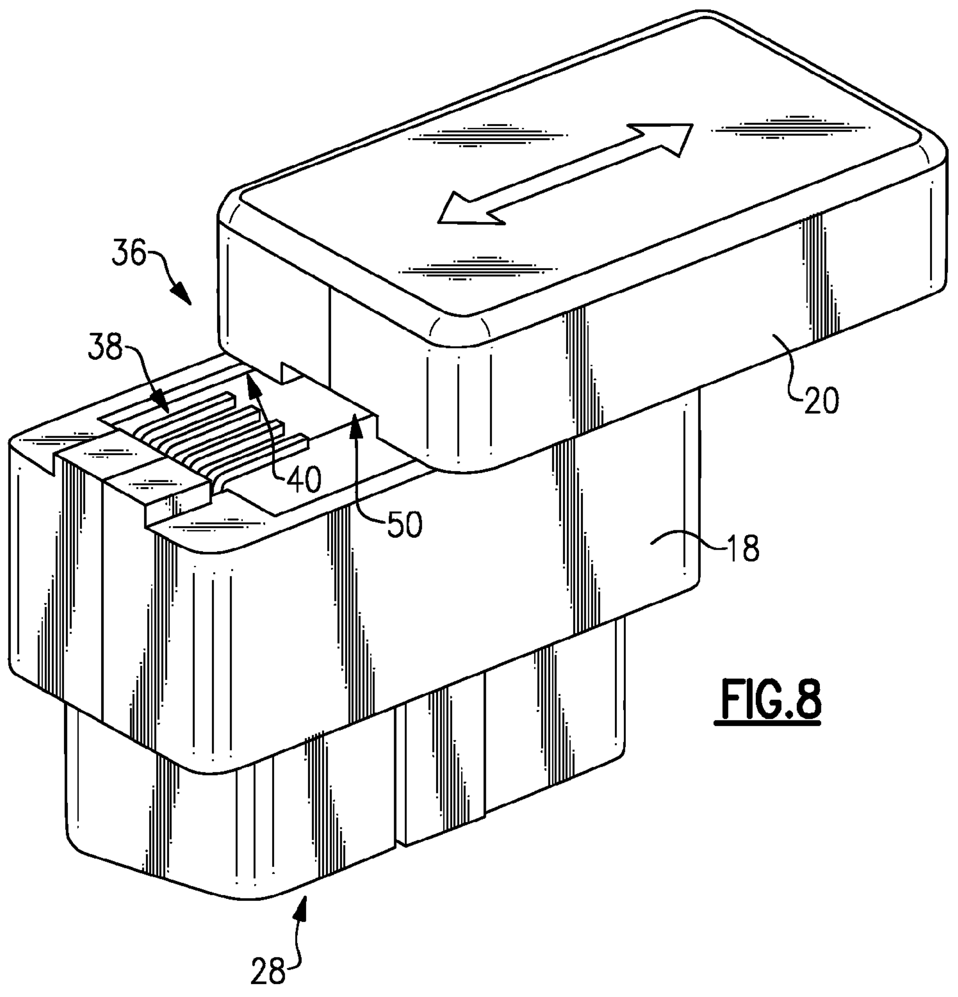
FIG. 8 is a perspective illustrating assembly of the subsystem module to the primary gateway connector.

Referring to FIG. 8, the subsystem module 20 is shown sliding onto the second connector 36 of the primary gateway connector 18. The tabs 42 of the subsystem module 20 slide within the slots 40 of the primary gateway connector 18. The electrical connectors 38 are received within the connectors 44 of the subsystem module 20. Locking features 54 provided on the subsystem module 20 along with a light interference fit between connectors 38 and 44 secures the subsystem module 20 to the primary gateway connector 18.

Referring to FIG. 9, the attached subsystem module 20 forms a secure rigid connection with the primary gateway connector 18 that provides a low profile. The secure rigid structure provided by the mating connection between the gateway connector 18 and the subsystem module 20 provides a desired low profile that does not interfere with operation of the vehicle. Moreover, the substantially low profile provides a concealment function that discourages tampering. As should be appreciated a specific subsystem module 20 can be provided concurrently with the primary gateway module to provide desired system functions and features.

Figure 10:
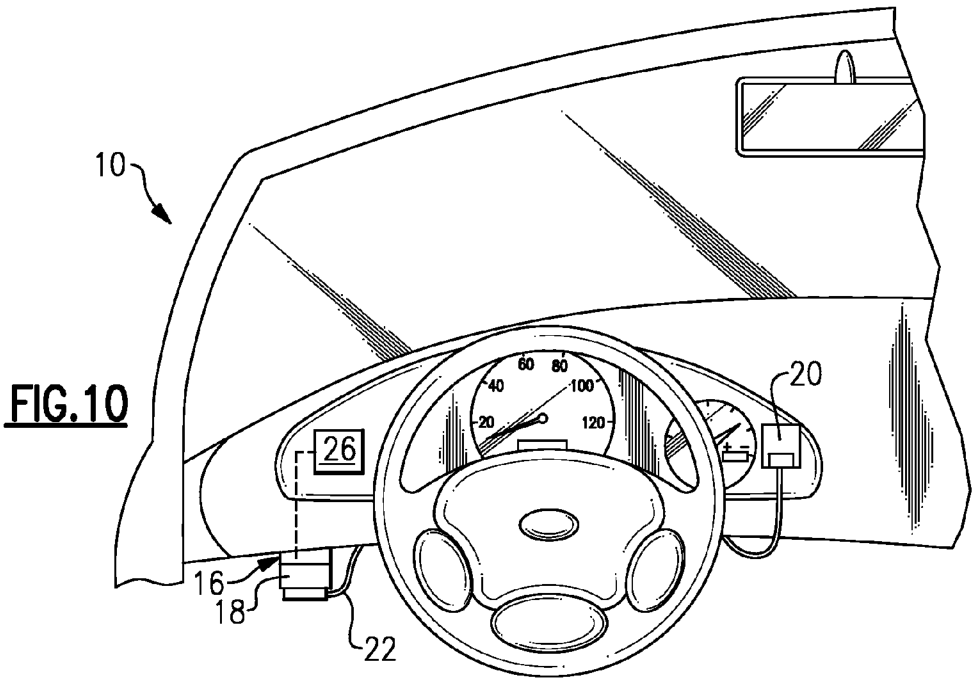
FIG. 10 is another example vehicle including another example telemetric system configuration.
Figure 11:
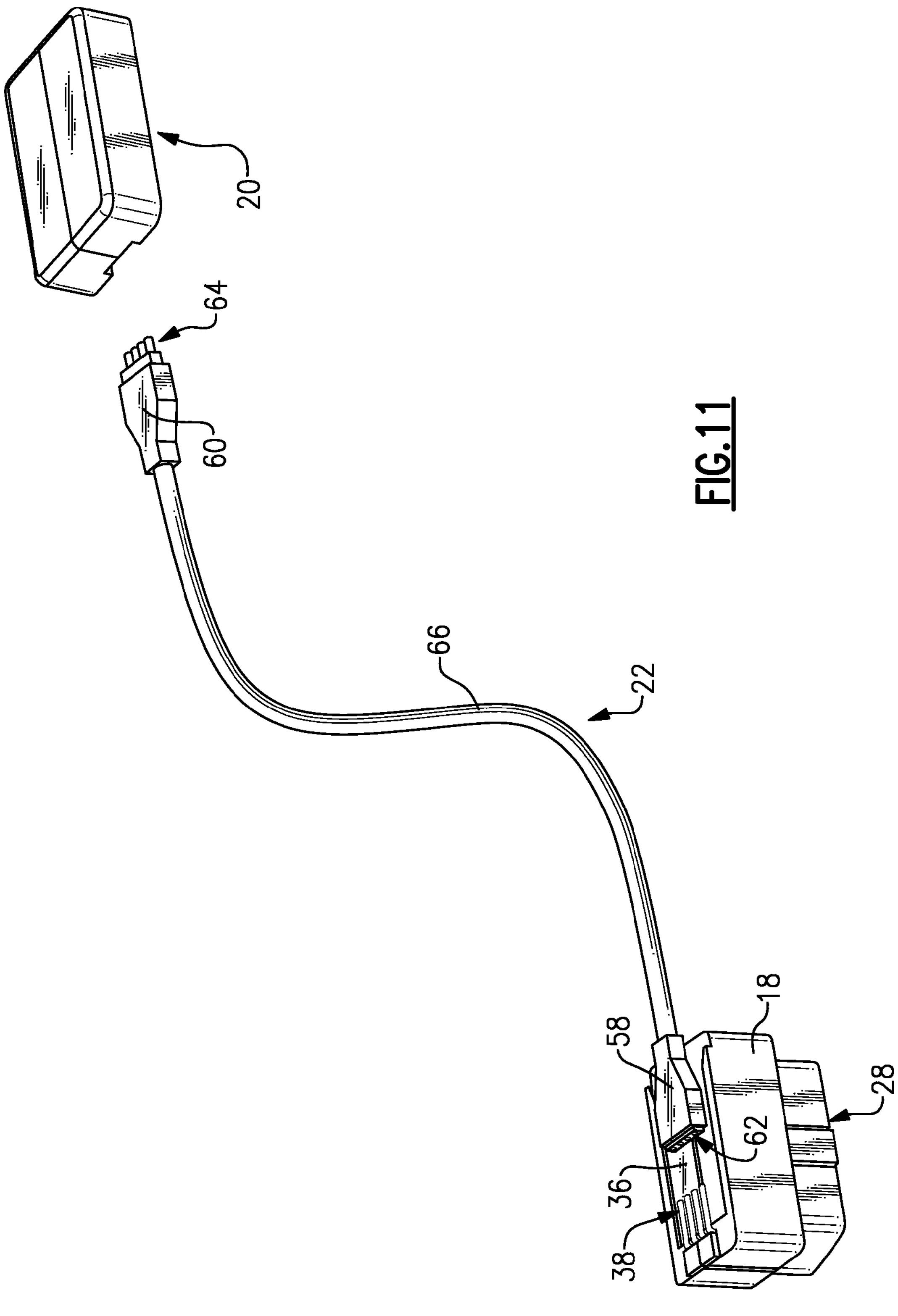
FIG. 11 is a perspective view of another example connection between the primary gateway connector and a subsystem module including a cable.

Referring to FIGS. 10 and 11, in an alternate configuration in some instances the RF features of the subsystem module 20 may be best utilized if mounted in a location remote from the OBD interface 16. In this instance a cable 22 is provided and connects the primary gateway connector 18 to a remotely mounted subsystem module 20. The example cable 22 includes a plurality of wires encased in a sheathing 66 that extends from a first connector 58 to a second connector 60. The first connector 58 includes female connectors 62 that mate to the connector pins 38 of the primary gateway connector 18. The second connector 60 includes connector pins 64 that mate with the corresponding connectors 44 of the subsystem module 20. The length of the cable 22 can vary to accommodate application specific mounting requirements.

The cable 22 provides for the subsystem module 20 to be mounted in a location remote from the OBD interface 16 that is more conducive to the specific operation desired by that subsystem module. For example in some applications the subsystem may provide for long range wireless communication. Accordingly, maximum optimization of and receipt of such signals can be optimized by mounting the subsystem modular in a position more conducive to receiving such signals such on a vehicle dash 12.

Furthermore, the subsystem module 20 could include features that require a substantially rigid mount that cannot be adequately provided by the OBD interface 16. Examples of such modules include subsystem modules 20 that include accelerometers or other gyro systems that require a substantially rigid attachment to the motor vehicle. In such instances the subsystem module 20 can be mounted as required to provide optimal operation of the specific features that the subsystem module 20 is intended to provide. The cable will then be connected between the primary gateway connector and the subsystem module 20.

Referring back to FIG. 1, moreover, additional connection and communication means could be utilized to communicate between the primary gateway connector 18 and the various subsystem modules 20, 24 installed within the motor vehicle. For example the primary gateway connector 18 includes RF communication features that may be included to provide a wireless communication link between remotely located subsystem modules such as the subsystem module 24 mounted to the dash 12 and not physically connected to the primary gateway connector 18. Accordingly, more than one such remotely located subsystem module 24 could be mounted within the motor vehicle and communicate concurrently with the primary gateway connector 18. In the illustrated example, the subsystem module 20 is physically attached to the primary gateway connector 18 while others are communicating with the same gateway connector 18 through wireless a communication link.

Figure 12:
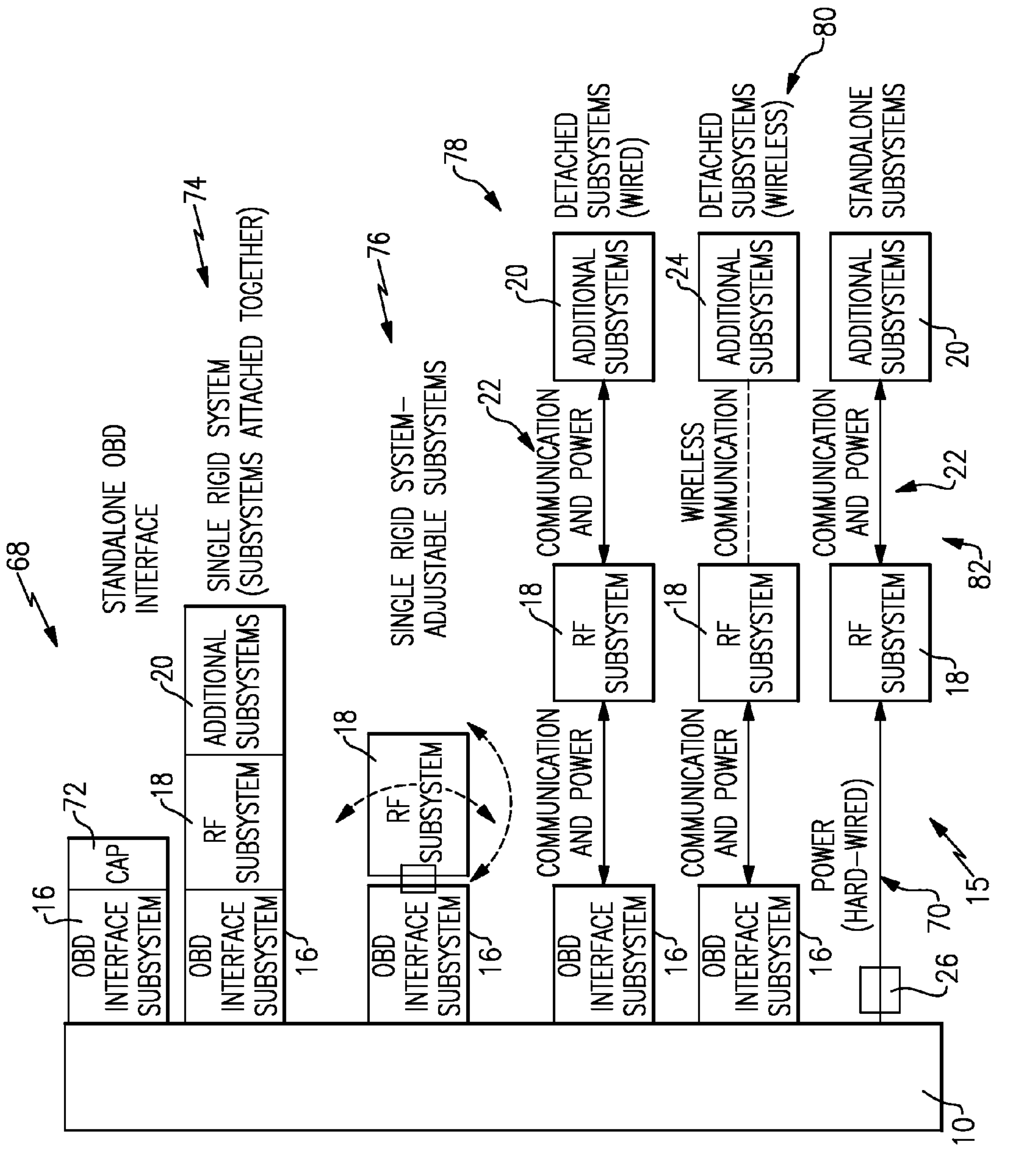
FIG. 12 is a schematic illustration of several example communication schemes between the example primary gateway and a subsystem module.

Referring to FIG. 12 a schematic view indicated at 68 illustrates various communication configurations possible in the example telematic system 15. A first possible configuration indicated at 70 includes no connection with a cap 72 provided to cover the exposed OBD connector 16.

A second possible configuration indicated at 74 includes installation of the primary gateway connector 18 with an attached subsystem module 20. This provides a single rigid compact low profile system. As is shown the primary interface is a physical rigid system interface where the primary gateway connector is rigidly attached to the OBD interface provided for within the motor vehicle.

An alternate configuration indicated at 76 utilizes only the primary gateway connector 18 as an RF link to information accessible through the OBD interface 16. An alternate configuration indicated at 78 includes the primary gateway connector 18 connected to the OBD interface 16 and communicating through a cable 22 to a detached and remotely located subsystem module 20.

Another alternate configuration indicated at 80 includes a wireless communication link with the subsystem modules 24 supported at various locations within the motor vehicle. In such a configuration, power may be supplied by way of the OBD interface 16 to the primary gateway connector 18. Additional power may be separately communicated through wired connections to each individual subsystem module 24.

Another configuration is indicated at 82 and includes the primary gateway connector 18 being connected to the vehicle diagnostic system through a hardwired connection 70 with the vehicle controller 26 or other portions of the vehicle 10 as may be required. This configuration provides for the primary gateway connector 18 to be mounted in locations other than from the OBD interface 16. This configuration may be utilized when it is desired to frequently switch subsystem modules 20. Accordingly, the primary gateway connector 18 can be mounted in a location that facilitates access and ease of mounting the desired subsystem module 20.

Accordingly, the disclosed telematic system 15 includes the primary gateway connector 18 that provides for communication with various subsystem modules. Moreover, the disclosed telematic system provides a modular system that simplifies both the physical and functional switch out of desired features provided by different subsystem modules. The example telematic system configuration provides the desired adaptability to specific vehicle applications in order to allow each of the subsystem modules to be mounted within the vehicle at locations that optimize performance. Moreover, the ease of forming the functional and physical connection between the primary gateway connector and the various subsystem modules allows the subsystem modules to be switched out as is desired by the operator to provide the desired functions and operability required for desired applications.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A vehicle telematic system comprising:

a primary gateway including an enclosure defining a first connector for forming a primary communication connection with an on-board diagnostic interface of a vehicle and a second connector with at least one circuit board disposed within the enclosure and in communication with the on-board diagnostic interface of the vehicle, the second connector defining a secondary communication interface; and at least one secondary system housed within a module separate from the primary gateway and mounted to the second connector and in communication with the on-board diagnostic interface of the vehicle through the secondary communication interface of the primary gateway.

2. The vehicle telematic system as recited in claim 1, wherein the second connector includes a mechanical and electrical connection that is selectively connectable to a corresponding secondary connector included with the secondary system.

3. The vehicle telematic system as recited in claim 2, wherein the second connector includes a plurality of electrical connectors and a slot for receiving a corresponding tab formed on the secondary system.

4. The vehicle telematic system as recited in claim 2, including a linking cable connectable at a first end to the second connector and at a second end to the secondary connector of the secondary system.

5. The vehicle telematic system as recited in claim 1, wherein the primary gateway includes a wireless communication device for forming a wireless communication link with the secondary system.

6. The vehicle telematic system as recited in claim 1, wherein the primary gateway includes a logic interface for analyzing information indicative of vehicle operation.

7. The vehicle telematic system as recited in claim 1, wherein the secondary system comprises a device capable of communication with a global network.

8. The vehicle telematic system as recited in claim 7, wherein the secondary system includes a radio frequency transmitter capable of both sending and receiving information.

9. A vehicle telematic system comprising:

a primary gateway module disposed within an enclosure, wherein the enclosure defines a first connector connectable to an on-board diagnostics interface for holding the primary gateway module in place and engaged to the on-board diagnostic interface, the primary gateway module including a logic interface for receiving information through the on-board diagnostics interface indicative of vehicle operation and a secondary communications link; and at least one subsystem module selectively engageable to the primary gateway through the secondary communications link, the subsystem module forming a communications link with the on-board diagnostics interface through engagement with the primary gateway module.

10. The vehicle telematic system as recited in claim 9, wherein the subsystem module comprises elements providing communications with a global network.

11. The vehicle telematic system as recited in claim 9, wherein the enclosure includes a second connector integrally formed in the housing that includes a plurality of electrical connectors and a first mating part that receives a corresponding mating part formed on the subsystem module.

12. The vehicle telematic system as recited in claim 11, including a cable having a first end engageable with the first mating part formed by the housing and a second end including a second mating part engageable with the subsystem module.

13. The vehicle telematic system as recited in claim 11, wherein the primary gateway module includes a transceiver for forming a wireless link with at least one subsystem module.

14. The vehicle telematic system as recited in claim 9, wherein the at least one subsystem comprises at least one of an accelerometer, a gyro and a global positioning device.

15. A method of linking vehicle telemetric system to a vehicle comprising:

connecting a first connector defined by an enclosure supporting a primary gateway module to an on-board diagnostics interface of a vehicle, wherein the enclosure defines a first connector for physically and electrically connecting to the on-board diagnostics interface; and establishing a communication link with the on-board diagnostics interface through a second connector defined by the enclosure of the primary gateway module with a subsystem module supported on the vehicle.

16. The method as recited in claim 15, wherein establishing the communication link comprises connecting the subsystem module to the second connector of the primary gateway module.

17. The method as recited in claim 15, wherein the primary gateway includes a transceiver and establishing the communication link comprises communicating between the subsystem module and the transceiver over a wireless link.

18. The method as recited in claim 15, including communicating with a global network with the subsystem module.

* * * * *